(12) United States Patent
Hashimoto (10) Patent No.: US 11,348,331 B2
(45) Date of Patent: May 31, 2022

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Ryoko Hashimoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 49 days.

(21) Appl. No.: 16/931,396

(22) Filed: Jul. 16, 2020

(65) Prior Publication Data

US 2021/0287029 A1 Sep. 16, 2021

(30) Foreign Application Priority Data

Mar. 10, 2020 (JP) .............................. JP2020-040977

(51) Int. Cl.
| | |
|---|---|
| *G06F 40/166* | (2020.01) |
| *G06V 10/98* | (2022.01) |
| *G06K 9/62* | (2022.01) |
| *G06F 3/0482* | (2013.01) |
| *G06V 30/10* | (2022.01) |

(52) U.S. Cl.
CPC .......... *G06V 10/987* (2022.01); *G06F 40/166* (2020.01); *G06K 9/6253* (2013.01); *G06K 9/6262* (2013.01); *G06F 3/0482* (2013.01); *G06V 30/10* (2022.01)

(58) Field of Classification Search
CPC .... G06K 9/033; G06K 9/6253; G06K 9/6262; G06K 2209/01; G06F 40/166; G06F 3/0482; G06F 40/279; G06F 40/106; G06F 3/018
See application file for complete search history.

(56) References Cited

U.S. PATENT DOCUMENTS

| | | | | |
|---|---|---|---|---|
| 6,535,619 | B1* | 3/2003 | Suwa | G06K 9/344 382/101 |
| 2011/0158517 | A1* | 6/2011 | Dai | G06K 9/34 382/165 |
| 2015/0071546 | A1* | 3/2015 | Fujieda | G06K 9/342 382/190 |
| 2016/0203625 | A1* | 7/2016 | Khan | G06K 9/2081 345/636 |
| 2020/0042786 | A1* | 2/2020 | Matsumae | H04N 1/2038 |
| 2020/0097711 | A1* | 3/2020 | Venkateswaran | G06K 9/00456 |

FOREIGN PATENT DOCUMENTS

| | | | |
|---|---|---|---|
| JP | 63271588 A | * | 11/1988 |
| JP | H05120471 | | 5/1993 |
| JP | H06131493 | | 5/1994 |

(Continued)

*Primary Examiner* — Keith D Bloomquist
(74) *Attorney, Agent, or Firm* — JCIPRNET (57) ABSTRACT

An information processing apparatus includes a processor configured to acquire (i) an image including characters and (ii) a character-recognition result obtained by applying character recognition on the image, and display, to a viewer of the character-recognition result, each character in the image and a recognized character corresponding to the character in a uniform size and at positions adjusted to indicate correspondence between the character and the recognized character.

7 Claims, 5 Drawing Sheets

(56) References Cited

FOREIGN PATENT DOCUMENTS

| | | | |
|---|---|---|---|
| JP | 2002007951 | 1/2002 | |
| JP | 2006196976 | 7/2006 | |
| KR | 100411697 B1 * | 3/2004 | ............. G06K 9/344 |
| RU | 2621601 C1 * | 6/2017 | ............... G06K 9/52 |
| WO | WO-2013118672 A1 * | 8/2013 | ........... G06K 9/6215 |

* cited by examiner

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-040977 filed Mar. 10, 2020.

BACKGROUND

(i) Technical Field

The present disclosure relates to an information processing apparatus and a non-transitory computer readable medium.

(ii) Related Art

Character-recognition techniques such as optical character recognition (OCR) have been used to recognize characters in read images of documents such as input forms and questionnaires containing handwritten characters. A read image and a character-recognition result are displayed next to each other, and an operation to check and correct the character-recognition result is performed. In the check and correction operation, if an error is found in the character-recognition result, a person in charge has to check and correct the error.

To assist in check and correction operations, for example, Japanese Unexamined Patent Application Publication No. 2006-196976 proposes a system in which a result obtained by OCR processing of a scanned document is output in the layout resembling the original document.

SUMMARY

Handwritten characters sometimes vary, for example, in character spacing and size. In such a case, for example, if an image that contains handwritten characters and a recognition result obtained by a character-recognition process are displayed, one above the other, for easy comparison, characters corresponding to each other are sometimes positioned incorrectly, causing difficulty in intuitive association between characters that need check and correction.

Aspects of non-limiting embodiments of the present disclosure relate to, during a check of a character-recognition result obtained by applying character recognition on a character image, displaying each character in the character image and a recognized character corresponding to the character in the character image, the character in the character image and the recognized character included in the character-recognition result being placed to indicate correspondence between the character in the character image and the recognized character, in a case where characters in the character image and recognized characters included in the character-recognition result are differently spaced.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to acquire (i) an image including characters and (ii) a character-recognition result obtained by applying character recognition on the image. The processor is further configured to display, to a viewer of the character-recognition result, each character in the image and a recognized character corresponding to the character in a uniform size and at positions adjusted to indicate correspondence between the character and the recognized character.

BRIEF DESCRIPTION OF THE DRAWINGS

An exemplary embodiment of the present disclosure will be described in detail based on the following figures, wherein.

DETAILED DESCRIPTION

Hereinafter, an exemplary embodiment of the present disclosure will be described with reference to the drawings.

Figure 1:
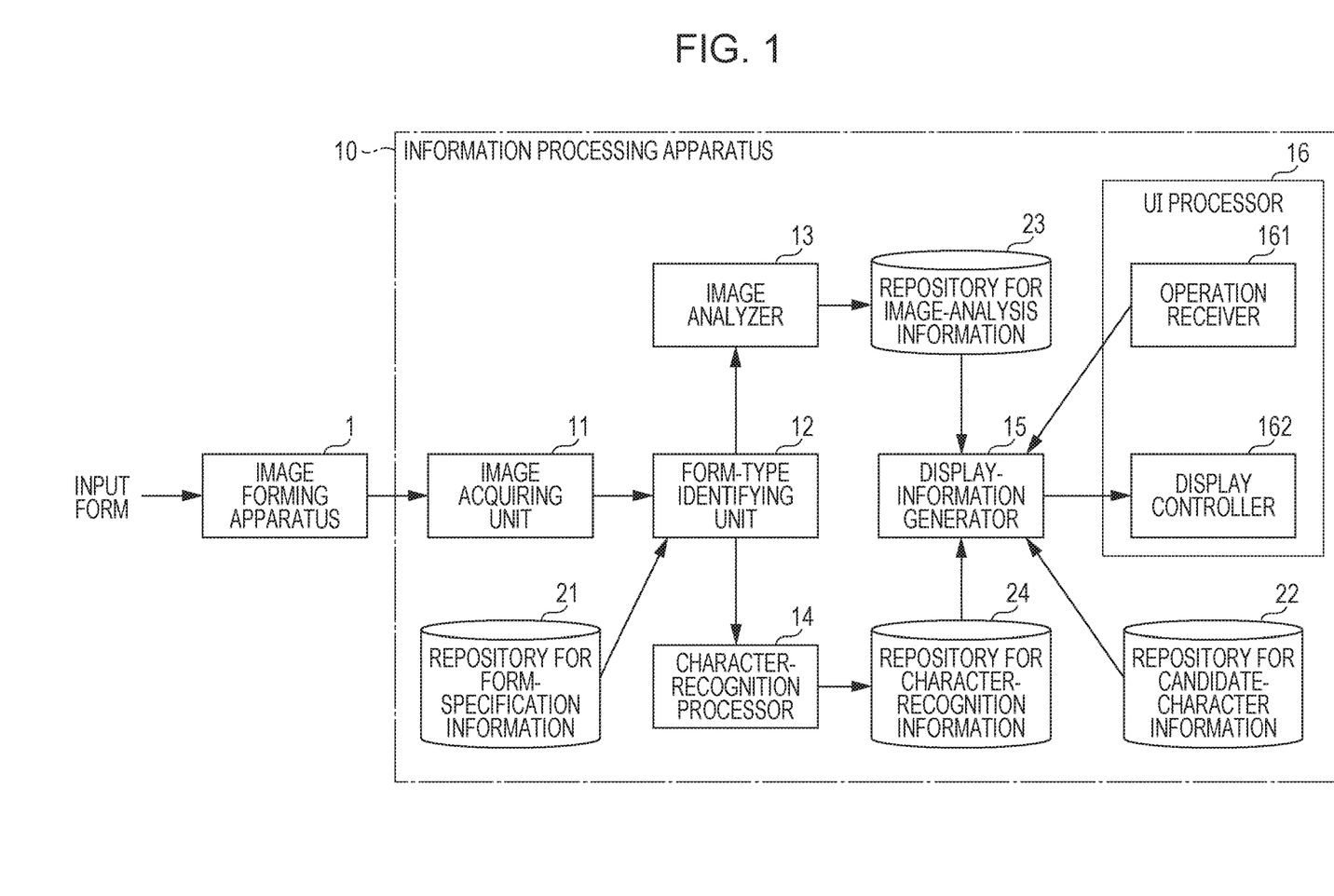
FIG. 1 is a block diagram depicting an information processing apparatus according to the exemplary embodiment of the present disclosure.

FIG. 1 is a block diagram depicting an information processing apparatus according to the exemplary embodiment of the present disclosure. An information processing apparatus 10 according to the present exemplary embodiment may be realized by using a general-purpose hardware configuration known in the art, such as a personal computer (PC). Specifically, the information processing apparatus 10 includes a central processing unit (CPU), a read-only memory (ROM), a random-access memory (RAM), a storage unit, interfaces, and a communication unit. Examples of the storage unit include a hard disk drive (HDD). The interfaces include a mouse and a keyboard installed as an input unit and a display installed as a display unit. Examples of the communication unit include a network interface.

As depicted in FIG. 1, the information processing apparatus 10 according to the present exemplary embodiment includes, an image acquiring unit 11, a form-type identifying unit 12, an image analyzer 13, a character-recognition processor 14, a display-information generator 15, a user interface (UI) processor 16, a repository for form-specification information 21, a repository for candidate-character information 22, a repository for image-analysis information 23, and a repository for character-recognition information 24. In FIG. 1, components that are not used for descriptions of the present exemplary embodiment are omitted.

In FIG. 1, an image forming apparatus 1 is also depicted. The image forming apparatus 1 is a multifunctional system having various functions such as a copying function and a scanning function and includes a built-in computer. The image forming apparatus 1 scans a document containing characters and produces an image of the document. In the present exemplary embodiment, it is assumed that an input form containing handwritten characters represents a document. Thus, the term "document" and the term "input form" are used interchangeably in the following descriptions. In the present exemplary embodiment, the term "character" means both a single character and a character string formed by a plurality of characters unless otherwise specified.

The image acquiring unit 11 acquires a read image of an input form. The read image is produced by the image forming apparatus 1. The form-type identifying unit 12 identifies the type of the input form by analyzing the read image. The image analyzer 13 analyzes a character entered on the input form, generates information regarding the character, and stores the information in the repository for image-analysis information 23 as image-analysis information. The data structure of image-analysis information will be described below.

The character-recognition processor 14 performs a character-recognition process on the input form to recognize a character entered on the input form, generates character-recognition information including the character-recognition result, and stores the character-recognition information in the repository for character-recognition information 24. The character-recognition result obtained by the character-recognition process is a result of recognizing the character entered on the input form and provides a character. The display-information generator 15 generates from the image-analysis information and the character-recognition information the information to be presented to a user as display information.

The user interface (UI) processor 16 includes an operation receiver 161 and a display controller 162. The operation receiver 161 accepts an input operation performed by the user by using the input unit. The display controller 162 controls display of the display unit.

The repository for form-specification information 21 stores form-specification information regarding a definition that is determined in advance for each type of input form to specify the region to which the character-recognition process is applied. The form-specification information for each type of input form includes a format of the input form, the location of an item name, and the location of an entry field to receive an item value, the locations being specified by coordinates on the input form.

The repository for candidate-character information 22 stores in advance one or more characters to be a candidate for correcting incorrect recognition of a character obtained in the character-recognition process. For example, a kanji character is typically formed by two or three parts. A kanji character formed by two parts may symbolically be represented by a combination of alphabetical characters such as "AB", in which "A" and "B" are the left portion and the right portion, respectively. For example, a kanji character "AC", which is also a proper kanji character and is formed by two parts "A" and "C", is a candidate for correction for "AB", where "C" is different from but may be similar to "B". Conversely, for "AC", "AB" is a candidate for correction. The image-analysis information and the character-recognition information stored in the repository for image-analysis information 23 and the repository for character-recognition information 24, respectively, are created during a display process described below and will be described together with a description of the display process.

Each of the components from 11 to 16 of the information processing apparatus 10 is realized by cooperative operation between a computer constituting the information processing apparatus 10 and programs operating on the CPU installed in the computer. The repositories 21 to 24 are realized by using the HDD installed in the information processing apparatus 10. Alternatively, the repositories may be realized by using the RAM or by using via a network a memory located externally.

In the present exemplary embodiment, the information processing apparatus 10 includes the components required for the process described below, but this is not meant to be limiting. For example, the information processing apparatus 10 may use a service function provided by an external system such as a cloud service to perform, for example, the character-recognition process.

The programs used in the present exemplary embodiment may be provided not only via the communication unit but also in a stored form by using a recording medium readable by a computer, such as a compact-disc ROM (CD-ROM) or a universal-serial-bus (USB) memory. The programs provided via the communication unit or by using the recording medium are installed into the computer, and the CPU of the computer executes the programs consecutively to realize various processes.

The information processing apparatus 10 according to the present exemplary embodiment applies the character-recognition process to a read image of a document such as an input form, recognizes characters in the read image, and is suitable for the use for an operation to check and correct the character-recognition result. In the following, a process of displaying characters on a screen will be described with reference to the flowchart depicted in FIG. 2. This display process is performed during the check and correction operation performed by a user, and a character in a read image of an input form and a character in a character-recognition result are displayed on the screen.

Figure 2:
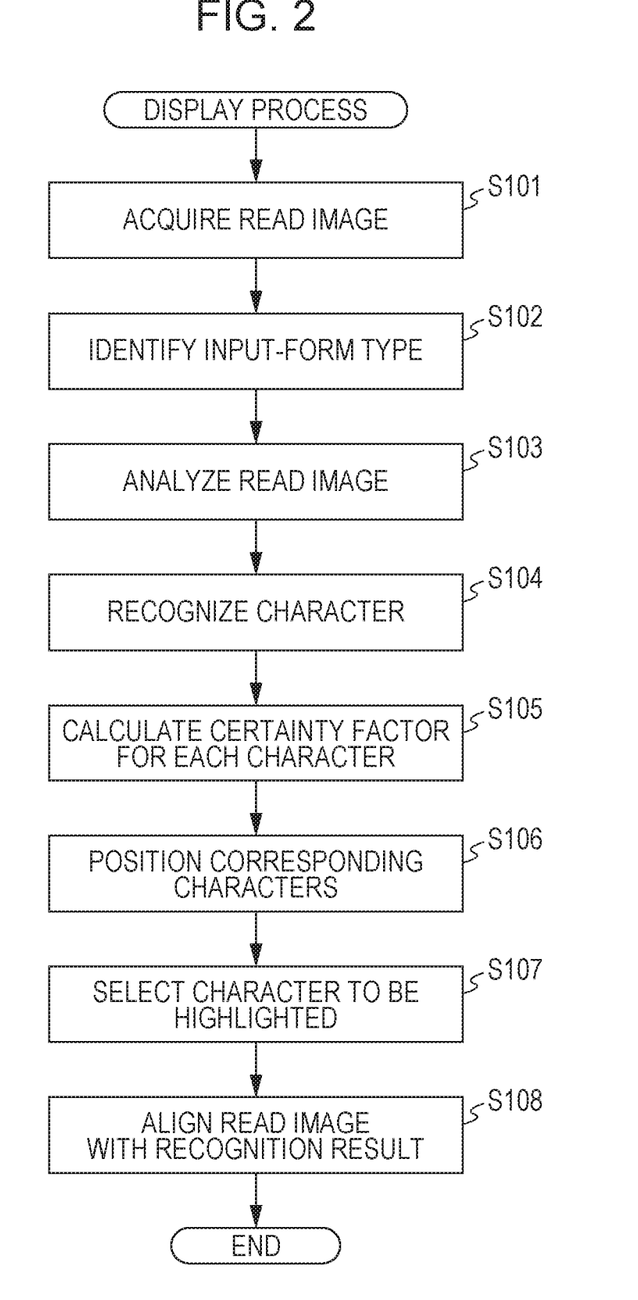
FIG. 2 is a flowchart depicting a display process according to the present exemplary embodiment.

Once the user causes the image forming apparatus 1 to scan an input form to be processed, the scanning function of the image forming apparatus 1 produces a read image of the input form. The image acquiring unit 11 acquires the read image of the input form from the image forming apparatus 1 (step S101).

Subsequently, the form-type identifying unit 12 compares the read image of the input form with formats of various input forms included in the form-specification information and identifies the type of the input form that is read (step S102). The information processing apparatus 10 identifies the type of the input form and references the form-specification information corresponding to the type of the input form. Thus, the information processing apparatus 10 can specify the location into which a character to be processed (assumed to be a handwritten character in the present exemplary embodiment) is entered in the read image, that is, the area into which the character is entered (what is called an entry field)

Figure 3:
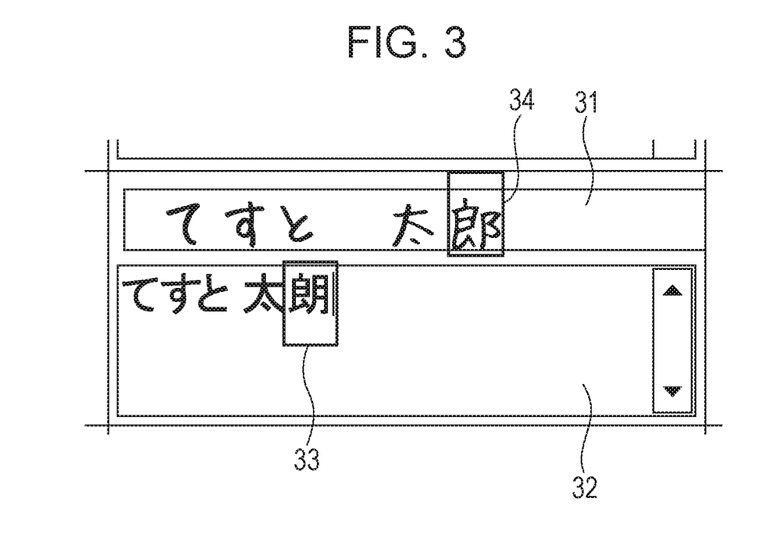
FIG. 3 is an illustration depicting an example of a screen display in which a read image and a character-recognition result are displayed, one above the other.
Figure 4:
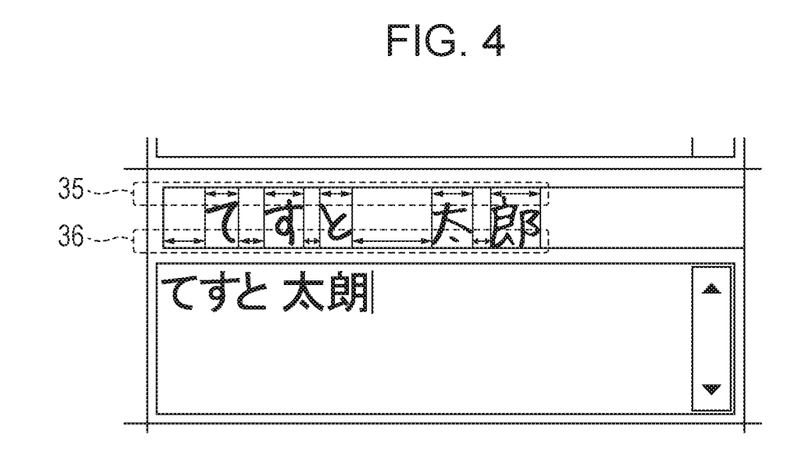
FIG. 4 is an illustration used to describe content of an analysis of the read image in FIG. 3.
Figure 5:
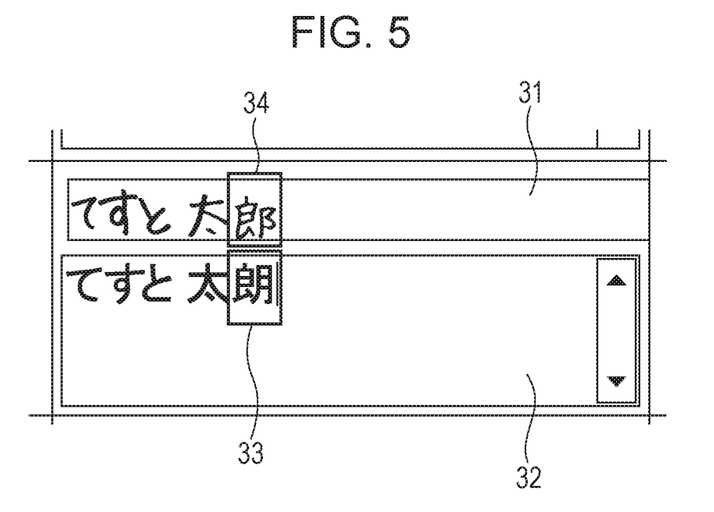
FIG. 5 is an illustration depicting an example of a screen display in which a read image and a character-recognition result are displayed according to the present exemplary embodiment.

Accordingly, the image analyzer 13 analyzes the read image and extracts an image in the specified area (step S103). Although an input form typically has a plurality of entry fields, a similar process is applied to each entry field. Thus, a description will be given of a single entry field of interest in the present exemplary embodiment. Specifically, as illustrated in FIGS. 3 to 5, an entry field for a name of a person will be described as an example. To describe characteristic processing according to the present exemplary embodiment, it is assumed that not a single character but a character string formed by a plurality of characters, such as a name of a person, is extracted from the entry field.

Upon extracting a character string from the read image, the image analyzer 13 stores the character string in the repository for image-analysis information 23. The image analyzer 13 further cuts out an image corresponding to each character that is part of the character string, determines the size of each character that is cut out, determines each interval between characters, and stores the sizes and the intervals in the repository for image-analysis information 23 as image-analysis information. The image-analysis information will further be described below.

In addition, the character-recognition processor 14 applies the character-recognition process to an area into which a character string is entered in the read image and obtains a recognition result for each character (step S104). Further, a certainty factor is calculated for each character, which constitutes a recognition result (step S105). The "certainty factor" is an index to evaluate the correctness of the result of the character-recognition process. The certainty factor is calculated by using a method known in the art. It is determined that the result of the character-recognition process, or the recognition result for a character, is more likely to be correct as the value representing the certainty factor increases. In contrast, the recognition result is less reliable, namely the recognition result is more likely to be incorrect as the certainty factor decreases. The character-recognition processor 14 associates the position of each character included in the character-recognition result, the character, which is the recognition result of each character, and the certainty factor of the character, generates character-recognition information, and stores the character-recognition information in the repository for character-recognition information 24.

In the flowchart depicted in FIG. 2, it is assumed that the image analyzer 13 processes data before the character-recognition processor 14. However, the character-recognition processor 14 may process data before the image analyzer 13, or the image analyzer 13 and the character-recognition processor 14 may process data simultaneously.

Subsequently, the display-information generator 15 generates display information in accordance with the generated image-analysis information and the generated character-recognition information, and the display controller 162 controls display in accordance with the display information. The process details will be described by using examples of a screen display depicted in FIGS. 3 to 5.

FIG. 3 is an illustration depicting an example of a screen display in which a read image and a character-recognition result are displayed one above the other. In FIG. 3, a read image of characters is displayed in a display area 31, and a recognition result of each character in the read image is displayed in a display area 32. The display-information generator 15 acquires the certainty factor of each character from the repository for character-recognition information 24, compares the certainty factor of each character with a predetermined threshold, and selects a character whose certainty factor is lower than the threshold as a character with less certainty, which is to be highlighted. In the example depicted in FIG. 3, a character 33 is highlighted as a recognized result having a low certainty factor. In addition, a character 34 in the read image is also highlighted. The character 34 corresponds to the character 33. In FIG. 3, as an example of a method of highlighting, the characters 33 and 34 to be highlighted are enclosed by frames. The method of highlighting will be described below.

In character recognition known in the related art, as depicted in the example in FIG. 3, the character 33, which is to be checked and corrected, is highlighted so as to be distinguished from a character whose certainty factor is equal to or larger than the threshold, that is, a character having a high certainty factor. However, the character 33 and the character 34, which corresponds to the character 33, are displayed at different horizontal positions.

Handwritten characters, even in the same character string, do not necessarily have a uniform size and are not necessarily evenly spaced. The size of handwritten characters and the interval between handwritten characters sometimes vary. In contrast, since a character-recognition result contains characters displayed by a computer, the size of characters and the interval between characters are fixed while a character string is manipulated in information processing and displayed except that a variable-width font, which has a different width for each character, is also available. Thus, corresponding characters are sometimes displayed at different positions, as in the case of the character 33 and the character 34 depicted in the example in FIG. 3. In the example in FIG. 3, a small number of characters are displayed. However, there is a case where a large number of characters are displayed, a character string displayed in the display area 32 contains one or more line breaks, or a large number of characters having a low certainty factor are present. In such a case, it is possible that a situation occurs in which a character in the read image, such as the character 34, is difficult to identify as the character that corresponds to a character having a low certainty factor, such as the character 33, by looking at highlighted characters in the display area 31.

In the present exemplary embodiment, in a case where a character-recognition result obtained by the character-recognition process is checked and characters in a read image and characters in the character-recognition result are differently spaced as illustrated in FIG. 3, each character in the read image and the character obtained as the recognition result of the character in the read image are placed so as to indicate correspondence between the character in the read image and the character obtained as the recognition result and are displayed in the same size as depicted in FIG. 5.

For this purpose, in step S103, if a character string is written horizontally as depicted in FIG. 4, the image analyzer 13 cuts out an image of each character that is part of the character string, produces one or more one-character images, and determines the width of each character in the read image as indicated by a dashed line 35. As indicated by a dashed line 36, each interval between characters is also obtained. For the first character, since an immediately preceding character (that is, a character on the left) is absent, a distance from the left side of the entry field is obtained. The size of each character is also obtained. The size of a character is obtained from the size of a rectangle enclosing the character. The width of the rectangle may be set to the width of the character described above, and the height of the rectangle may be set to the height of the entry field. The image analyzer 13 stores as the image-analysis information the information regarding the image and the size of each character and the intervals between characters, which are described above, in addition to the read image of the entire character string, in the repository for image-analysis information 23. The case of horizontal writing is described as an example, but the case of vertical writing can be handled similarly.

As describe above, the character-recognition result contains characters to be displayed by a computer. Thus, the size of a character and the interval between characters do not need adjustments. Obviously, the size of a character, which is a font size, can be changed, and the amount of character spacing is also adjustable. However, in the present exemplary embodiment, each character in the read image is displayed so as to match the corresponding character included in the character-recognition result.

Specifically, when the character-recognition result is displayed in the display area 32 as depicted in FIG. 5, the read image and the character-recognition result are displayed, one above the other. In such a case, the display-information generator 15 individually positions characters in the read image so that each of the characters in the read image is placed right above the corresponding character of the five characters displayed in the display area 32 (step S106). As is evident from comparison between FIG. 3 and FIG. 5, the character 34, which corresponds to the character 33, is placed right above the character 33, which has a small certainty factor, in FIG. 5 because of this process. In other words, a combination of characters that correspond to each other, that is, the characters 33 and 34, is clearly presented. Since the font size used by the computer to display characters is known, the display-information generator 15 appropriately enlarges or reduces characters in the read image to generate display information so as to match the size of the characters in the read image with the size of the characters in the character-recognition result for easy comparison between the characters by the user.

After positioning the displayed characters as above, the display-information generator 15 references the character-recognition information to refer to the certainty factor of each character included in the character-recognition result and selects the character 33 having a low certainty factor as a target to be highlighted (step S107). In this way, the display controller 162 displays the read image and the character-recognition result, one above the other, in accordance with the generated display information (step S108). The display controller 162 highlights both of the character 33, which is selected and has a low certainty factor, and the character 34, which corresponds to the character 33.

According to the present exemplary embodiment, since each character in the read image and the character obtained as the recognition result of the character in the read image are placed so as to indicate correspondence between the character in the read image and the character obtained as the recognition result and are displayed in the same size as described above, the character-recognition result is efficiently checked and corrected. If the read image contains a large number of characters and the character-recognition result is displayed in multiple lines in the display area 32, a character in the read image that corresponds to a character having a low certainty factor can easily be found because the character in the read image that corresponds to the character having a low certainty factor is placed above the character having a low certainty factor.

Here, highlighting will be described. In the present exemplary embodiment, a character having a low certainty factor and the character in the read image that corresponds to the character having a low certainty factor are paired and highlighted. In the above description, a case where each highlighted character is enclosed by a frame is illustrated by way of non-limiting example. For example, a character having a low certainty factor may be highlighted in bold type or displayed by using a character of a large size so that the character is distinguishable from a character having a high certainty factor. Alternatively, a character having a low certainty factor and a character having a high certainty factor may be differently colored. The methods of highlighting described above may be combined for display.

If a plurality of characters having a low certainty factor are present, those characters may be highlighted in different manners, for example, by changing the shape of frames or by changing the color of characters. In such a case, the character in the read image that corresponds to a character having a low certainty factor is desirably displayed in the same manner as the manner in which the corresponding character having a low certainty factor is displayed. In this way, the combination of the character in the read image and the corresponding character is easily identified. For example, if a character string is normally displayed in black, a character having a high certainty factor is similarly displayed in black. A different color for display is assigned to each different character having a low certainty factor. For example, a character having a low certainty factor is displayed in red, another character is displayed in green, and still another character is displayed in blue.

Next, additional functions provided in the present exemplary embodiment will be described.

Figure 6:
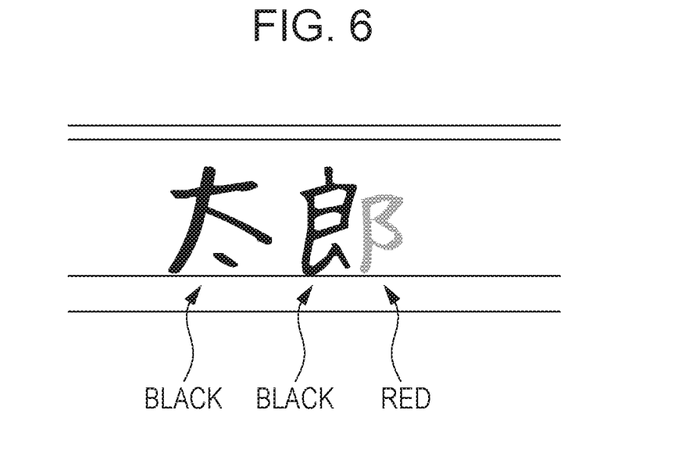
FIG. 6 is an illustration that enlarges a portion of a display area, in which characters in a read image are displayed.

FIG. 6 is an illustration that enlarges a portion of the display area 31, in which characters in the read image are displayed. If a character in the read image and the character in the recognition result are different, highlighting may be applied not to the entire character in the read image but to a portion of the character in the read image that differs from the counterpart of the character in the recognition result.

For example, a character obtained as a recognition result is rendered into an image, and the rendered image is compared with the character in the read image. In FIG. 5, an example of incorrect recognition of a kanji character is depicted. In this particular combination of the kanji characters 33 and 34, the left portions are the same, but the right portions are different. Thus, the display-information generator 15 analyzes the images of a combination of characters that correspond to each other, identifies the difference between the image of a character having a low certainty factor in the recognition result and the image of the character in the read image that corresponds to the character in the recognition result in the combination, and highlights the difference by differently coloring the identified portion of the image of the character in the read image. Specifically, in FIG. 6, if a character string is normally displayed in black, the first kanji character on the left and the left portion of the second kanji character are displayed in black, and the right portion of the second kanji character is displayed in red. In this way, the difference between the character in the read image and the character in the recognition result may be extracted and the extracted different portion may be highlighted.

Figure 7:
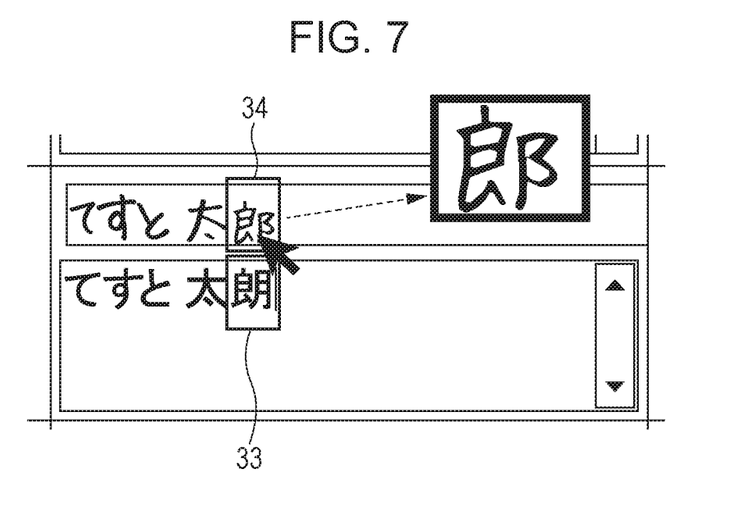
FIG. 7 is an illustration depicting an example of a screen display in which the cursor is placed on a character in the read image on the display screen depicted in FIG. 5.

FIG. 7 is an illustration depicting an example of a screen display in which the cursor is placed on a character in the read image on the display screen depicted in FIG. 5. If the user performs an operation such as moving a mouse and places the cursor, for example, on the character 34, the character 34, on which the cursor is placed, is enlarged and displayed as depicted in FIG. 7. In this way, if the character 34, which is displayed in the display area 31, is not sufficiently large for easy recognition, the handwritten character becomes easy to recognize.

In the present exemplary embodiment, in response to the user operation of placing the cursor on the character 34, which the user desires to enlarge and display, the character 34 is enlarged and displayed, but an operation to enlarge and display a character is not limited to this example. For example, the cursor may be placed on the character 33, which is the corresponding character in the recognition result. Alternatively, an operation button for enlarging and displaying may be disposed, and the operation button may be operated.

Figure 8:
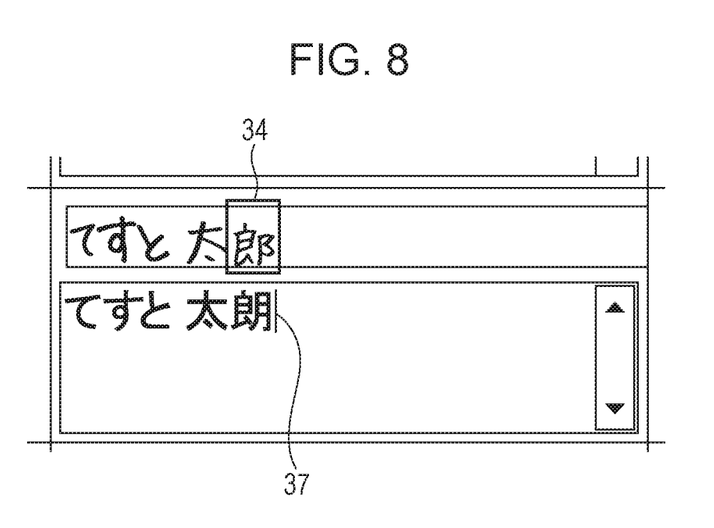
FIG. 8 is an illustration depicting an example of a screen display in which a character in the read image is selected on the display screen depicted in FIG. 5.

FIG. 8 is an illustration depicting an example of a screen display in which a character in the read image is selected on the display screen depicted in FIG. 5. In FIG. 7, if the cursor is placed on the character 34, the character 34 is enlarged and displayed. Further, clicking while the cursor is on the character 34 may switch to an edit mode. In FIG. 8, if the character 34 is clicked and selected, the character 33 in the recognition result, which corresponds to the character 34 and is displayed right below the character 34, is selected for editing and becomes editable. In FIG. 8, a cursor 37 appears on the character right below the character 34, indicating that the character is editable. In this way, the user is allowed to correct a character obtained as the recognition result.

In the correction operation described with reference to FIG. 8, the user is expected to look at the character in the read image and to input a correct character by hand. In the character-recognition process, characters which are likely to be confused with each other are predictable to some extent. Apart from the characters 33 and 34 described above, if a kanji character is formed by three parts, the top portion, the left portion, and the right portion and has the top portion and the right portion that are the same as the top portion and the right portion of another kanji character, respectively and only the left portion is different, these two kanji characters are likely to be confused with each other. Accordingly, the display-information generator 15 may reference the candidate-character information to acquire one or more candidate characters to replace the character to be corrected, the candidate characters being candidates for a character to be obtained by correct recognition of the character in the read image (in the following description, referred to as a "correct character"). Then, the display-information generator 15 may display a list of acquired candidates for the correct character so that the user can choose a character from the list. For example, in response to a right click on the recognition result, one or more candidates for the correct character are displayed in a pull-down menu. In such a case, the user is not expected to enter a correct character by hand but expected to choose a correct character from the one or more displayed candidates. Two or more candidates for the correct character may be displayed.

For example, if the correct character is a kanji character, the user enters alphabetical characters or hiragana characters and converts these characters into a kanji character. However, if the user does not know how to pronounce the correct kanji character, the user is not able to correct the character, which is known to be incorrect. Obviously, the correct character needs to be included in the candidate characters, but the user is able to correct the incorrect character if the user does not know the pronunciation of the correct character since the user only chooses a character from candidate characters.

As described above, various functions to assist the user in the operation to check and correct a character-recognition result are provided according to the present exemplary embodiment.

In the embodiment above, the term "processor" refers to hardware in a broad sense. Examples of the processor include general processors (e.g., CPU: Central Processing Unit), and dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to
acquire (i) an image including characters and (ii) a character-recognition result obtained by applying character recognition on the image, and
display, to a viewer of the character-recognition result, each character in the image and a recognized character corresponding to the character in a uniform size and at positions adjusted to indicate correspondence between the character and the recognized character,
wherein the processor is configured to:
acquire a certainty factor of each recognized character obtained by the character recognition, and
apply highlighting to a combination of a recognized character whose certainty factor is lower than a threshold and an image of a character corresponding to the recognized character whose certainty factor is lower than the threshold,
wherein the highlighting is applied not to an entirety of the image of the character corresponding to the recognized character whose certainty factor is lower than the threshold, but only to a mismatched portion of the image of the character corresponding to the recognized character whose certainty factor is lower than the threshold, the mismatched portion being a portion determined to have a partial character mismatch with the recognized character whose certainty factor is lower than the threshold.

2. The information processing apparatus according to claim 1,
wherein the highlighting uses at least one of
(a) a bold type,
(b) an increased character size,
(c) a frame, and
(d) a different color that is different from a color used for a combination of a recognized character whose certainty factor is equal to or larger than the threshold and an image of a character corresponding to the recognized character whose certainty factor is equal to or larger than the threshold.

3. The information processing apparatus according to claim 1,
wherein the processor is configured to, in response to an operation performed on the image of the character corresponding to the recognized character whose certainty factor is lower than the threshold, display an enlarged image of the character on which the operation has been performed.

4. The information processing apparatus according to claim 1,
wherein the processor is configured to, in response to selection of the image of the character corresponding to the recognized character whose certainty factor is lower than the threshold, display in an editable manner the recognized character whose certainty factor is lower than the threshold.

5. The information processing apparatus according to claim 4,
wherein the processor is configured to
acquire one or more candidate characters for replacing the recognized character whose certainty factor is lower than the threshold, and
display the one or more candidate characters in a selectable manner.

6. A non-transitory computer readable medium storing a program causing a computer to execute a process for information processing, the process comprising:
acquiring (i) an image including characters and (ii) a character-recognition result obtained by applying character recognition on the image;
displaying, to a viewer of the character-recognition result, each character in the image and a recognized character corresponding to the character in a uniform size and at positions adjusted to indicate correspondence between the character and the recognized character;
acquiring a certainty factor of each recognized character obtained by the character recognition; and
applying highlighting to a combination of a recognized character whose certainty factor is lower than a threshold and an image of a character corresponding to the recognized character whose certainty factor is lower than the threshold,
wherein the highlighting is applied not to an entirety of the image of the character corresponding to the recognized character whose certainty factor is lower than the threshold, but only to a mismatched portion of the image of the character corresponding to the recognized character whose certainty factor is lower than the threshold, the mismatched portion being a portion determined to have a partial character mismatch with the recognized character whose certainty factor is lower than the threshold.

7. An information processing apparatus comprising:
means for acquiring (i) an image including characters and (ii) a character-recognition result obtained by applying character recognition on the image;
means for displaying, to a viewer of the character-recognition result, each character in the image and a recognized character corresponding to the character in a uniform size and at positions adjusted to indicate correspondence between the character and the recognized character;
means for acquiring a certainty factor of each recognized character obtained by the character recognition; and
means for applying highlighting to a combination of a recognized character whose certainty factor is lower than a threshold and an image of a character corresponding to the recognized character whose certainty factor is lower than the threshold,
wherein the highlighting is applied not to an entirety of the image of the character corresponding to the recognized character whose certainty factor is lower than the threshold, but only to a mismatched portion of the image of the character corresponding to the recognized character whose certainty factor is lower than the threshold, the mismatched portion being a portion determined to have a partial character mismatch with the recognized character whose certainty factor is lower than the threshold.

\* \* \* \* \*